United States Patent
Hazra et al.

(10) Patent No.: US 9,014,868 B2
(45) Date of Patent: *Apr. 21, 2015

(54) POWER FACTOR (75) Inventors: Jagabondhu Hazra, Bangalore (IN);
Balakrishnan Narayanaswamy, Bangalore (IN); Devasenapathi P. Seetharamakrishnan, Bangalore (IN); Liyanage Chandratilak De Silva, Muara (BN)

(73) Assignees: International Business Machines Corporation, Armonk, NY (US); Universiti Brunei Darussalam, Muara (BN)

( * ) Notice: Subject to any disclaimer, the term of this patent is extended or adjusted under 35 U.S.C. 154(b) by 478 days.

This patent is subject to a terminal disclaimer.

(21) Appl. No.: 13/433,653

(22) Filed: Mar. 29, 2012

(65) Prior Publication Data
US 2013/0261822 A1    Oct. 3, 2013

(51) Int. Cl.
*G06F 19/00* (2011.01)
*H02J 3/18* (2006.01)
*G05B 15/02* (2006.01)

(52) U.S. Cl.
CPC . *H02J 3/18* (2013.01); *G05B 15/02* (2013.01); *Y02E 40/30* (2013.01)

(58) Field of Classification Search
USPC ............ 700/296, 295, 293, 286, 287; 702/61, 702/62; 705/30
See application file for complete search history.

(56) References Cited

U.S. PATENT DOCUMENTS

| | | | |
|---|---|---|---|
| 4,119,907 A | 10/1978 | Quinn | |
| 5,315,236 A * | 5/1994 | Lee | 324/157 |
| 6,216,956 B1 * | 4/2001 | Ehlers et al. | 236/47 |
| 6,700,358 B2 | 3/2004 | McDaniel et al. | |
| 7,002,321 B2 | 2/2006 | McDaniel et al. | |
| 7,804,280 B2 | 9/2010 | Deaver, Sr. et al. | |
| 7,860,702 B1 | 12/2010 | Evans et al. | |
| 7,893,663 B2 | 2/2011 | Ng | |
| 7,945,401 B2 | 5/2011 | Bowdry et al. | |
| 8,010,240 B2 * | 8/2011 | Mattiocco et al. | 700/296 |

(Continued)

FOREIGN PATENT DOCUMENTS

EP    2128439 A1    12/2009
WO    2010019468 A2    2/2010

(Continued)

OTHER PUBLICATIONS

Bapat et al., User-senstivive Scheduling of House Appliences, Aug. 19, 2011, IBM Reseach Indiia , pp. 43-48.*

(Continued)

*Primary Examiner* — Kidest Bahta
(74) *Attorney, Agent, or Firm* — Ryan, Mason & Lewis, LLP (57) ABSTRACT

An apparatus and an article of manufacture for improving power factor include collecting consumption data of at least one appliance, building a consumption profile for each of the at least one appliance based on the consumption data collected, reconstructing reactive power consumption of each of the at least one appliance based on the consumption profile for each of the at least one appliance, and computing a schedule for each of the at least one appliance in accordance the reactive power consumption of each of the at least one appliance to improve power factor while respecting at least one constraint.

20 Claims, 5 Drawing Sheets

(56) References Cited

U.S. PATENT DOCUMENTS

| | | | |
|---|---|---|---|
| 8,543,247 B2* | 9/2013 | Boss et al. ................. | 700/291 |
| 2003/0233201 A1* | 12/2003 | Horst et al. ................ | 702/62 |
| 2009/0045803 A1 | 2/2009 | Schoettle | |
| 2009/0207753 A1* | 8/2009 | Bieganski ................. | 370/254 |
| 2010/0115785 A1 | 5/2010 | Ben-Shmuel et al. | |
| 2010/0208501 A1 | 8/2010 | Matan et al. | |
| 2010/0262311 A1 | 10/2010 | Santacatterina et al. | |
| 2011/0071695 A1 | 3/2011 | Kouroussis et al. | |
| 2011/0172792 A1* | 7/2011 | Shinohara et al. ........ | 700/90 |
| 2012/0016528 A1 | 1/2012 | Raman et al. | |

FOREIGN PATENT DOCUMENTS

| | | | |
|---|---|---|---|
| WO | 2010045726 A1 | 4/2010 | |
| WO | 2011029137 A2 | 3/2011 | |
| WO | 2012004597 A2 | 1/2012 | |

OTHER PUBLICATIONS

Schneider Electric, Power Quality Correction Equipment, 2008, pp. 1-16.

Improving Efficiency and Accessibility of Micro Hydro Power Through Intelligent Load Management, Econnect Ltd. and SCS Ltd., Contract No. H/03/00076/00/00, VRN No. 071674, 2003, pp. 1-44.

Standardizing the Classification of Intelligence Levels and Performance of Electricity Supply Chains, The Association of Electrical and Medical Imaging Equipment Manufacturers, Jun. 30, 2009, pp. 1-24.

Distributed Energy, Communication and Controls, (DECC), Oak Ridge National Laboratory, Oct. 23, 2007, pp. 1-4.

Film Capacitors, Power Factor Correction, BR6000 V5.0, May 2009, pp. 1-6.

Quick Response Fast Switching PFC, Capacitor, GE Digital Energy, downloaded May 1, 2012, pp. 1.

ABB RVC, Power Factor Controllers (Power Quality Products) downloaded May 1, 2012, pp. 1.

Basu et al., A Novel Common Power Factor Correction Scheme for Homes and Offices, IEEE Transactions on Power Delivery, vol. 20, No. 3, Jul. 2005, pp. 2257-2263.

Levelized Cost of New Generation Resources in the Annual Energy Outlook 2011, Released Dec. 16, 2010, Report of the US Energy Information Administration (EIA) of the U.S. Department of Energy (DOE), pp. 1-4.

A Preliminary Analysis of the Economics of Using Distributed Energy as a Source of Reactive Power Supply, ORNL and Energetics Incorporated, Apr. 2006, pp. 1-65.

Electricity Explained, http://www.eia.gov/energyexplained/index.cfm?page=electricity_use downloaded May 1, 2012, pp. 1-2.

Tariffs Information for the Traditional WEL Network, May 1, 2005, pp. 1-3.

SPR: Power Factor Correction Services, downloaded May 1, 2012, pp. 1.

U.S.-Canada Power System Outage Task Force, Final Report on the Aug. 14, 2003, Blackout in the United States and Canada: Causes and Recommendations, Apr. 2004, pp. 1-30.

Kueck et al., Local Dynamic Reactive Power for Correction of System Voltage Problems, Oak Ridge National Laboratory, Sep. 30, 2008, pp. 1-86.

* cited by examiner

POWER FACTOR

FIELD OF THE INVENTION

Embodiments of the invention generally relate to information technology, and, more particularly, to power factor technology.

BACKGROUND

Power factor (PF) is a measure of electrical efficiency and is given by the ratio of kilo-watt (KW) to kilo-volt-ampere (KVA). KW is actual power consumed by a load whereas KVA is total power delivered to the load. The power consumed is referred to as active power and the remaining is referred to as re-active power, and only the active power does the actual work. However, even though reactive power does not perform any actual work, it still needs to be generated and carried.

Power factor varies between 0 (least efficient) and 1 (most efficient). When PF<1, KVA travels through the wires between the load and the utility grid, passing back and forth through, for example, a residential meter. Disadvantages of low power factor include, by way of example, substantially higher monthly electricity bills if reactive power is charged, large capacity payments for providing reactive power, and reduction of the lifetime of devices.

Improving the power factor is referred to as Power Factor Correction (PFC). Historically, PFC has been achieved through specialized, expensive and difficult-to-maintain hardware at the distribution or consumption site. However, existing approaches such as capacitor banks have a number of disadvantages. For example, capacitors are large, so the cost of plant real estate must be included in economic considerations. Additionally, capacitor banks can provide reactive power but they cannot absorb it, and capacitor banks typically have a life of less than ten years, thereby requiring repeated capital investments.

SUMMARY

In one aspect of the present invention, techniques for improving power factor are provided. An exemplary computer-implemented method for improving power factor can include steps of collecting consumption data of at least one appliance, building a consumption profile for each of the at least one appliance based on the consumption data collected, reconstructing reactive power consumption of each of the at least one appliance based on the consumption profile for each of the at least one appliance, and computing a schedule for each of the at least one appliance in accordance the reactive power consumption of each of the at least one appliance to improve power factor while respecting at least one constraint.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes decentralized power factor correction via intelligent load scheduling. As also described herein, an example embodiment of the invention provides a saving in electricity bills by reducing reactive power drawn from grid, a reduction in distribution system losses by improving power factor, as well as an improved voltage profile by reducing back and forth reactive power flow within grid and load.

In at least one embodiment of the invention, capacitive loads (such as light-emitting diode (LED) lights and electronics) can be scheduled to be run at the same time as highly inductive loads (such as washing machines, etc.). The net power factor at the mains/meter will by much closer to 1, and the capacitive loads can essentially provide reactive power for the inductive loads. Also, in accordance with at least one embodiment of the invention, because the schedules are software only, no extra hardware (for example, a capacitor bank, switching circuits, etc.) is required.

As described herein, a framework for improving the power factor, for example, at a residence, includes taking into account customer specific preferences and needs, as well as other factors such as available sources of power including but not limited to solar power, wind power, local generation, and other renewable sources. In an example embodiment of the invention, a circuit can be designed and implemented such that the electrical distance between inductive and capacitive loads is reduced to reduce the power losses (due to back and forth reactive power flow).

An aspect of the invention includes considering the location of non-critical and critical loads (for example, in the same home or building), including distance reduction loss due to a power factor less than 1. User preferences can be created through analysis of historical data or through explicit user input in a consumption profiler. Further, user preferences are considered in the compared work. For example, the non-critical can be used if plugged-in or not used if not plugged-in. Devices can be scheduled or rescheduled, and schedulable loads such as dishwashers and washing machines are neither critical nor non-critical because they are deferrable but have deadlines.

Accordingly, an aspect of the invention includes collecting and building user preferences, and using the preferences to understand when best to schedule and reschedule loads to improve power factor. Improving power factor at a residence, for example, prevents reactive power from oscillating from the generator to load requiring larger capacity build up.

Figure 1:
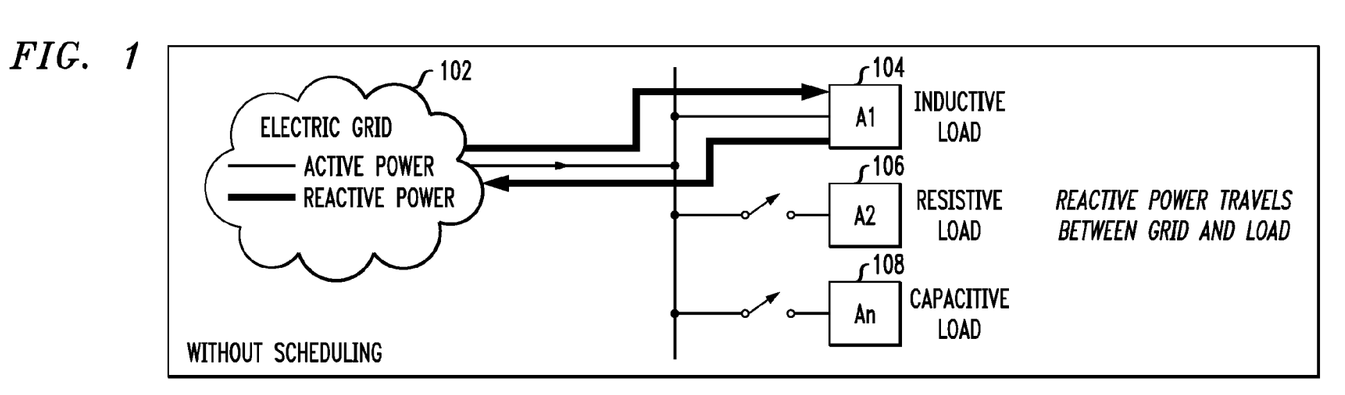
FIG. 1 is a diagram illustrating power travelling without scheduling.

FIG. 1 is a diagram illustrating power travelling without scheduling. By way of illustration, FIG. 1 depicts an electric grid 102 that provides active power (thin grey line) and reactive power (thicker black line). FIG. 1 also depicts an inductive load 104, a resistive load 106 and a capacitive load 108. As illustrated in FIG. 1, without scheduling, the reactive power travels between the grid 102 and the inductive load 104.

In every cycle of alternating current, inductive load 104/capacitive load 108 stores a part of the supplied energy as a magnetic field/electric field during half of the cycle and stored energy returns to the source in the remaining half-cycle. Hence, if the loads operate individually, the source needs to supply this circulating energy. Fortunately, when capacitor loads are charged, inductive loads are discharged and vice versa. Accordingly, while they operate together, in one half-cycle, capacitive load 108 supplies reactive power to the inductive load 104 and in the other half-cycle, inductor load 104 sends back the stored energy to the capacitor load 108. Thus, stored energy circulates within the inductive and capacitive loads that minimize the long distance circulating power between source and load.

Additionally, when loads draw the circulating reactive power from source, a significant portion of this power is lost (as $I^2R$ loss where I is current and R is resistance of the wire) when travelling through long distance transmission lines. If reactive power circulates locally within inductive and capacitive loads, it reduces transmission loss significantly and also relieves some capacity on the transmission line.

Figure 2:
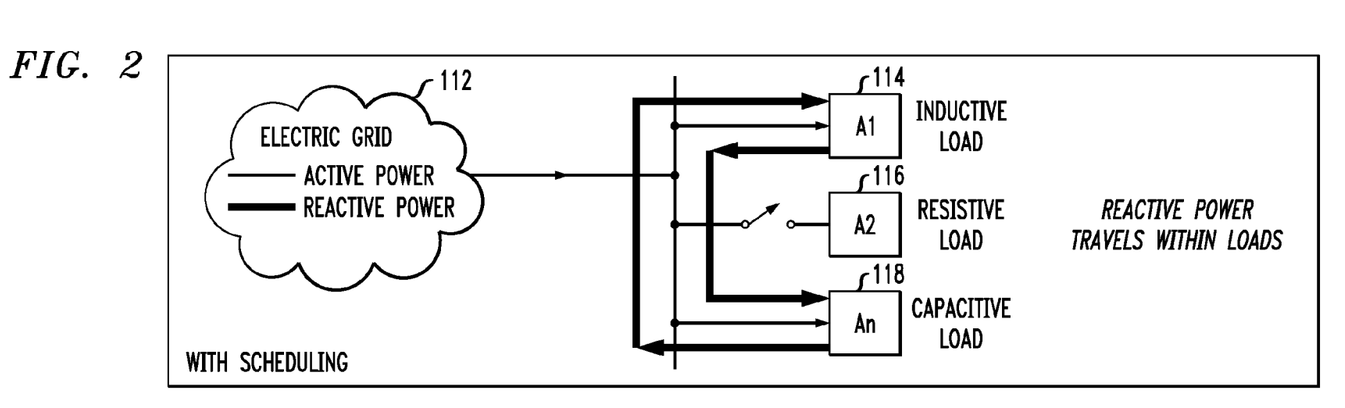
FIG. 2 is a diagram illustrating power travelling with scheduling, according to an embodiment of the present invention.

FIG. 2 is a diagram illustrating power travelling with scheduling, according to an embodiment of the present invention. By way of illustration, FIG. 2 depicts an electric grid 112 that provides active power (thin grey line) and reactive power (thicker black line). FIG. 2 also depicts an inductive load 114, a resistive load 116 and a capacitive load 118. As illustrated in FIG. 2, with scheduling, the reactive power travels within loads.

Figure 3:
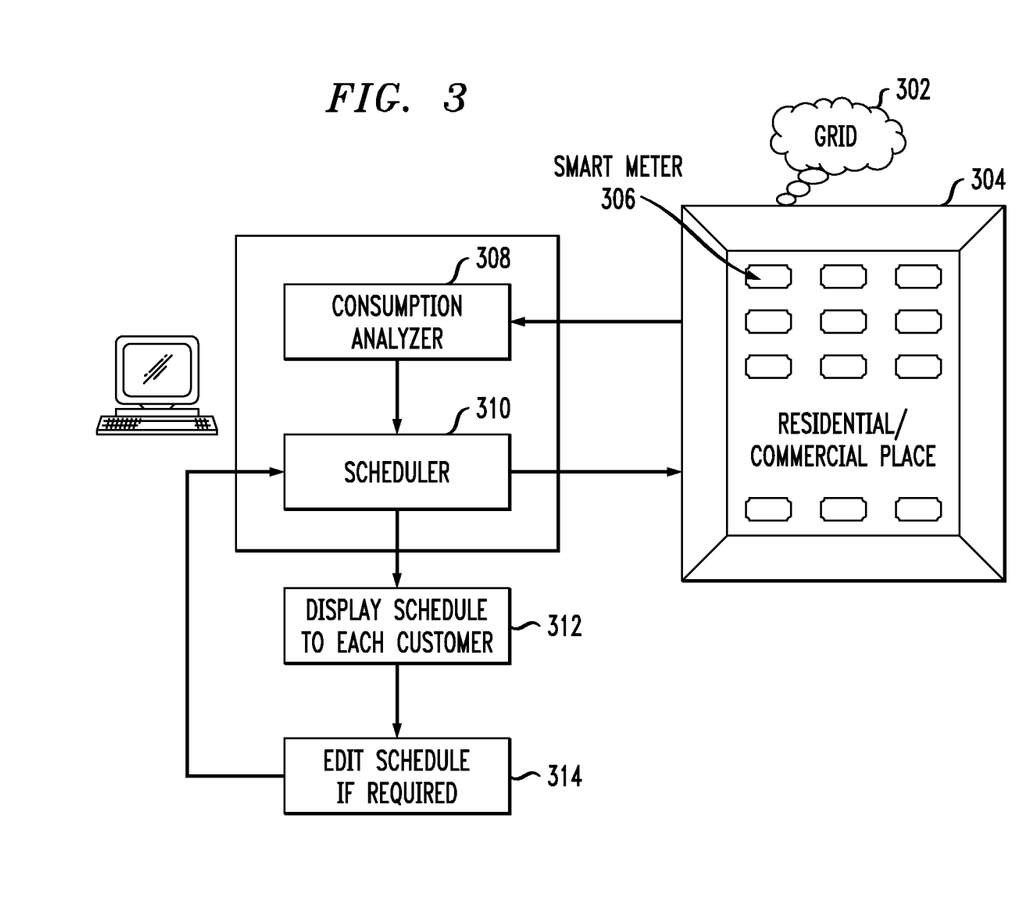
FIG. 3 is a block diagram illustrating an example embodiment, according to an aspect of the invention.

FIG. 3 is a block diagram illustrating an example embodiment, according to an aspect of the invention. FIG. 3 depicts a grid 302 as well as a residential or commercial location 304. Further, as depicted in FIG. 3, a PFC system of an example embodiment of the invention includes a smart meter 306, a consumption analyzer/profiler module 308 and a scheduler module 310.

The smart meter 306 measures active and reactive power consumption of appliances. A smart meter can already be installed at many homes due to smart grid initiatives, or can be installed at a device-level or a main-level or both. The consumption profiler software module 308 can be run on data collected from the smart meter 306, and can collect and update consumption profiles of appliances. Further, the consumption profiler module 308 reconstructs active and reactive power consumption of each appliance. An embodiment of the invention can either utilize plug-level meters (where available) or non-intrusive Appliance Load Metering (NIALM) along with a database of device characteristics to reconstruct appliance consumption profiles.

The scheduler software module 310, which can be installed at home, industry or commercial locations, stores and processes consumption history and appliance profiles. Additionally, the scheduler module 310 computes schedules for appliances to improve power factor while respecting external constraints (such as user availability, comfort, etc.). As depicted in FIG. 3, the scheduler module displays the schedule to each customer in step 312, and can also edit the schedule (if required) in step 314.

Figure 4:
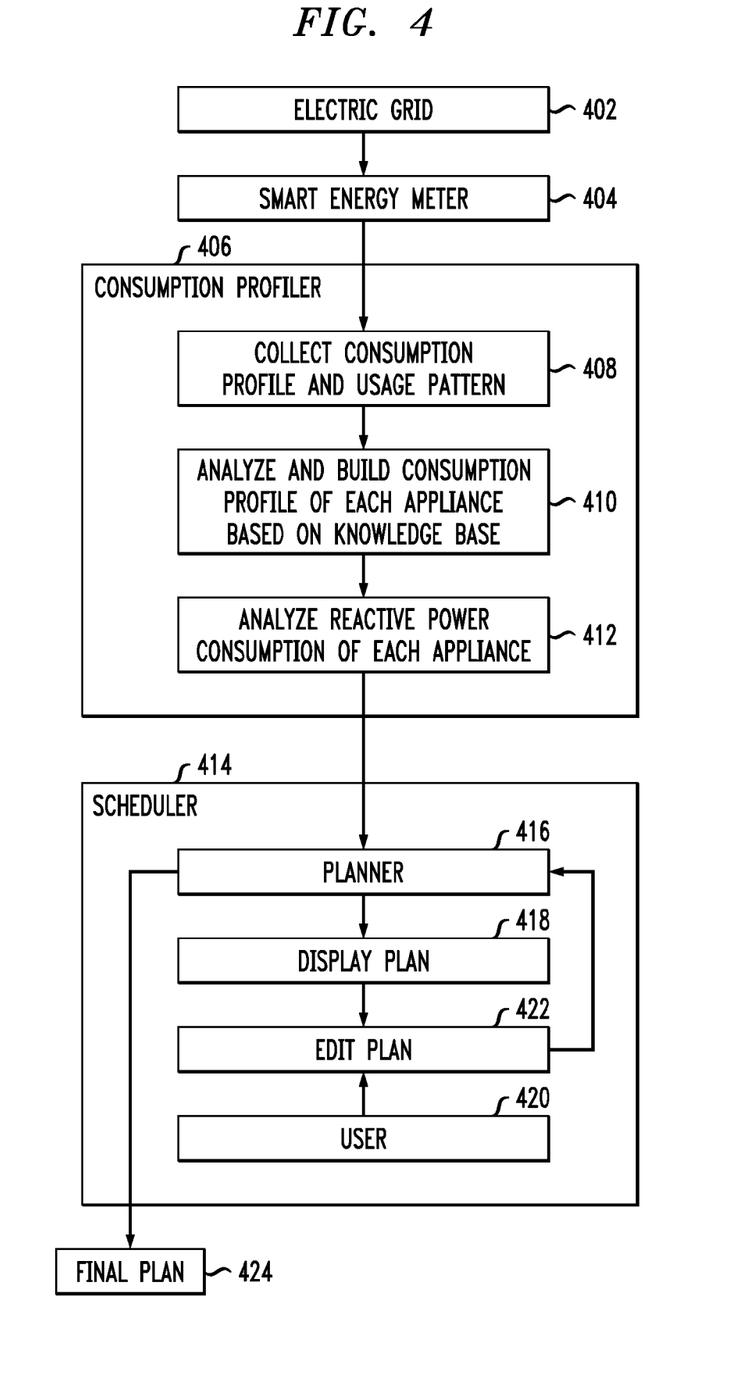
FIG. 4 is a diagram illustrating operational modality, according to an embodiment of the present invention.

FIG. 4 is a diagram illustrating operational modality, according to an embodiment of the present invention. By way of illustration, FIG. 4 depicts an electric grid 402, a smart energy meter 404, a consumption profiler module 406 and a scheduler module 414. As also depicted in FIG. 4, the electric grid 402 provides electricity which is measured by the energy smart meter 404, which thereby provides input to the consumption profiler module 406. Therein, step 408 includes collecting a consumption profile and usage patterns. Step 410 includes analyzing and building a consumption profile of each appliance based on a knowledgebase. Additionally step 412 includes analyzing reactive power consumption of each appliance.

The consumption profiler module 406 accordingly provides input to the scheduler module 414. The scheduler module 414 includes a planner component 416, which displays the plan in step 418. Also, user input 420 can cause the scheduler module 414 to edit the plan in step 422. Ultimately, the final plan 424 is generated.

An aspect of the invention includes classifying the consumption patterns of loads as resistive, inductive or capacitive. Additionally, the inductive and capacitive appliances are scheduled in such a way that reactive power travels within the group of inductive and capacitive appliances, reducing back and forth movement of reactive power within appliances and the grid. In accordance with at least one embodiment of the invention, this is achieved by minimizing following cost function:

$$g = E + \sum_{j=1}^{d'} [\epsilon_1 * I_1^j + \epsilon_2 * I_2^j];$$

$$\sum_{j=1}^{d'} L_j \leq S_c;$$

$$E = \sum_{t=1}^{k} \left( \sum_{j=1}^{d'} y_{jt} \right) \times R_t,$$

where E is a cost for consuming reactive power, y is the level of reactive power consumption which is a function the power factor, R is the rate for reactive power, d' is the number of appliances, $\epsilon$ is a weight factor, $I_1$ and $I_2$ are measures of the user inconvenience when the operating level and operating time (respectively) of the device are modified to improve power factor, $L_j$ is power consumed by load and $S_c$ is source power capacity.

By way of illustration, an example embodiment of the invention can include obtaining load characteristics such as power profile over time, and power factor profile over time for different appliance at a location. Accordingly, an aspect of the invention can then include using a combinatorial optimization to co-schedule devices, shift or reschedule devices and schedule power sources to trade-off overall power factor and customer utility. A combinatorial solution algorithm can search through all or a large portion of the space of possible solutions that satisfy the constraints in order to find a schedule that maximizes objective function value. Optimal algorithms can include (but are not limited to) search algorithms such as breadth first or depth first search of possible schedules. In at least one embodiment of the invention, intelligent elimination of infeasible or low objective value solutions can also be incorporated to improve computational efficiency.

An aspect of the invention can also include using sub-optimal convex approximations to the overall power factor, utility and constraints to generate a formulation which can be solved optimally. Further, another aspect of the invention can include using sub-optimal non-convex approximations followed by sub-optimal heuristics to schedule the loads. When the number of appliances is large, (sub-optimal) approximations can be used to schedule devices using various heuristics. Heuristics reduce the computational cost at the cost of possible sub-optimality of the objective function value. Heuristics can include but are not limited to branch and bound algorithms, A* search and genetic algorithms. Such heuristics intelligently eliminate or postpone the evaluation of large sets of unlikely solutions.

By way of example, if capacitive and inductive loads are scheduled to run at the same time, the net power factor can be increased, resulting in improved power factor without special hardware. Additionally, at least one embodiment of the invention includes a circuit design to minimize distance between scheduled inductive and capacitive loads.

Figure 5:
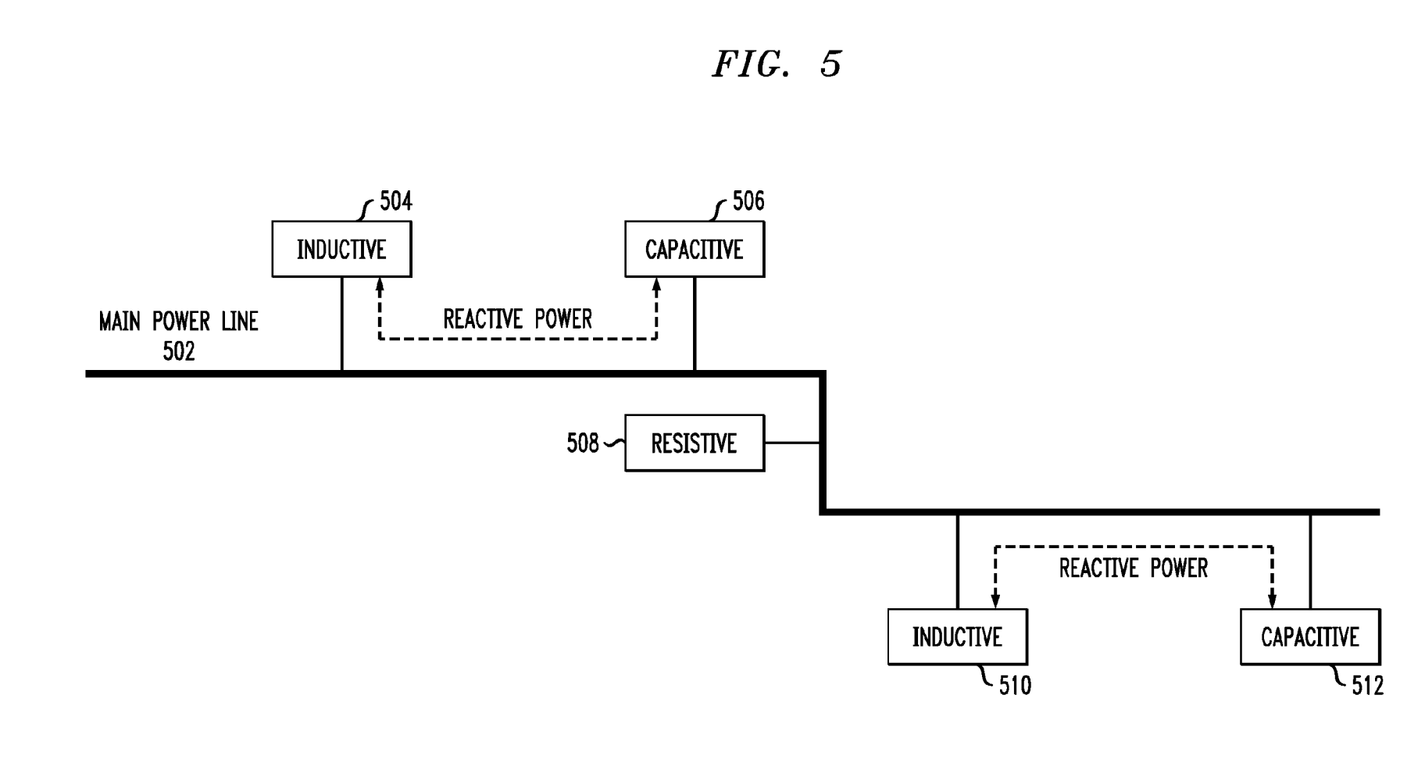
FIG. 5 is a diagram illustrating an example circuit design to minimize circulating reactive power, according to an embodiment of the present invention.

FIG. 5 is a diagram illustrating an example circuit design to minimize circulating reactive power, according to an embodiment of the present invention. By way of illustration, FIG. 5 depicts a main power line 502, inductive load 504, capacitive load 506, resistive component 508, inductive load 510 and capacitive load 512. FIG. 5 displays a circuit design where inductive and capacitive loads are connected close to each other, thereby minimizing the reactive power circulation path between inductive and capacitive loads. This reduces power loss behind the meter. For example, if the locations of loads 506 and 510 are interchanged, reactive power has to travel a longer distance as the group of inductive loads is farther from the group of capacitive loads. This would increase the loss on the line while transmitting power.

Figure 6:
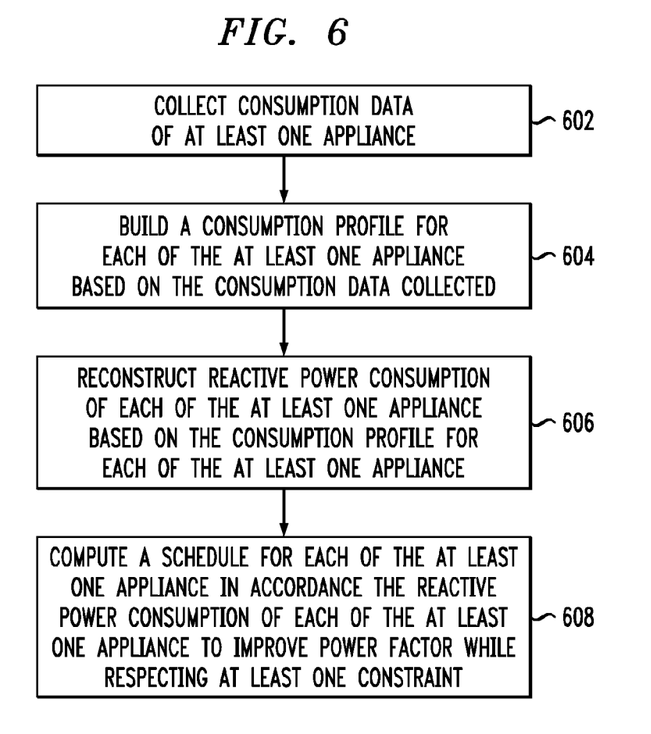
FIG. 6 is a flow diagram illustrating techniques for improving power factor, according to an embodiment of the invention.

FIG. 6 is a flow diagram illustrating techniques for improving power factor, according to an embodiment of the present invention. Aspects of the invention can be carried out, for example, both automatically and via manual implementation. Step 602 includes collecting consumption data of at least one appliance. This step can be carried out, for example, using a consumption profiler module. Collecting consumption data of at least one appliance can include collecting consumption data from a smart meter. Also, the at least one appliance can be a component of a residence, a group of residences or a commercial location.

Step 604 includes building a consumption profile for each of the at least one appliance based on the consumption data collected. This step can be carried out, for example, using a consumption profiler module. Step 606 includes reconstructing reactive power consumption of each of the at least one appliance based on the consumption profile for each of the at least one appliance. This step can be carried out, for example, using a consumption profiler module.

Step 608 includes computing a schedule for each of the at least one appliance in accordance the reactive power consumption of each of the at least one appliance to improve power factor while respecting at least one constraint. This step can be carried out, for example, using a scheduler module. Constraints can include, by way of example, user availability, comfort, user preference for device usage time and duration and delay, user preference for device usage intensity and change in intensity, user preference for device co-scheduling and re-scheduling, cost related to reactive power, and available source of power. Available sources of power can include, but are not limited to, solar power, wind power, local generation, and other renewable sources which have different active and reactive power costs and characteristics.

Computing a schedule for each of the at least one appliance can include co-scheduling multiple appliances to improve a net power factor. Also, computing a schedule for each of the at least one appliance can include re-scheduling an appliance based on real-time pricing of reactive power.

The techniques depicted in FIG. 6 can also include storing the consumption profile for each of the at least one appliance in a database. Additionally, as described herein, an embodiment of the invention can include displaying the schedule via an output device, as well as editing the schedule based on user input. Further, the consumption profile of an appliance can be updated. As also detailed herein, the techniques depicted in FIG. 6 can include implementing a circuit so as to reduce electrical distance between inductive and capacitive loads so that power loss is reduced.

The techniques depicted in FIG. 6 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include a consumption profiler module and a scheduler module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 7:
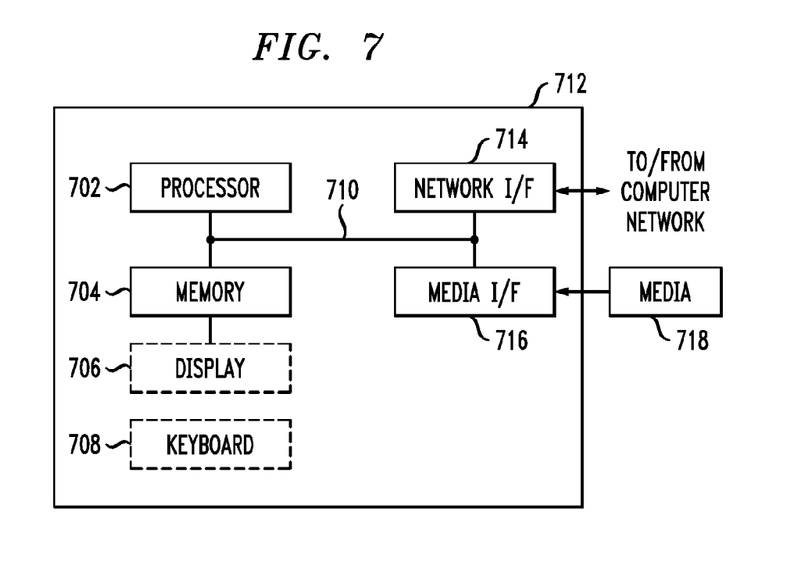
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, improving a voltage profile by reducing back and forth reactive power flow within grid and load.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a computer readable storage medium having computer readable instructions tangibly embodied thereon which, when implemented, cause a computer to carry out a plurality of method steps comprising:

collecting consumption data of at least one inductive appliance and at least one capacitive appliance;

building a consumption profile for each of the at least one inductive appliance and the at least one capacitive appliance based on the consumption data collected;

reconstructing reactive power consumption of each of the at least one inductive appliance and the at least one capacitive appliance based on the consumption profile for each of the at least one inductive appliance and the at least one capacitive appliance, wherein said reactive power is distinct from active power, said reactive power being stored in the given appliance and said active power being consumed by the given appliance; and computing an operating schedule for a subset of the at least one inductive appliance and the at least one capacitive appliance, in accordance with the reconstructed reactive power consumption, to reduce reactive power flow within the at least one inductive appliance and the at least one capacitive appliance to improve power factor while respecting at least one constraint.

2. The article of manufacture of claim 1, wherein the computer readable instructions which, when implemented, further cause a computer to carry out a method step comprising: editing the operating schedule based on user input.

3. The article of manufacture of claim 1, wherein collecting consumption data of the at least one inductive appliance and the at least one capacitive appliance comprises collecting consumption data from a smart meter.

4. The article of manufacture of claim 1, wherein the at least one constraint comprises at least one of user availability, comfort, user preference for device usage time and duration and delay, user preference for device usage intensity and change in intensity, user preference for device co-scheduling and re-scheduling, cost related to reactive power, and available source of power.

5. The article of manufacture of claim 1, wherein said computing the operating schedule comprises co-scheduling multiple appliances to improve a net power factor.

6. The article of manufacture of claim 1, wherein said computing the operating schedule comprises re-scheduling an appliance based on real-time pricing of reactive power.

7. A system for improving power factor, comprising:
at least one distinct software module, each distinct software module being embodied on a tangible computer-readable medium;
a memory; and
at least one processor coupled to the memory and operative for:
collecting consumption data of at least one inductive appliance and at least one capacitive appliance;
building a consumption profile for each of the at least one inductive appliance and the at least one capacitive appliance based on the consumption data collected;
reconstructing reactive power consumption of each of the at least one inductive appliance and the at least one capacitive appliance based on the consumption profile for each of the at least one inductive appliance and the at least one capacitive appliance, wherein said reactive power is distinct from active power, said reactive power being stored in the given appliance and said active power being consumed by the given appliance; and
computing an operating schedule for a subset of the at least one inductive appliance and the at least one capacitive appliance, in accordance with the reconstructed reactive power consumption, to reduce reactive power flow within the at least one inductive appliance and the at least one capacitive appliance to improve power factor while respecting at least one constraint.

8. The system of claim 7, wherein the at least one processor coupled to the memory is further operative for:
editing the operating schedule based on user input.

9. The system of claim 7, wherein the at least one processor coupled to the memory operative for collecting consumption data of the at least one inductive appliance and the at least one capacitive appliance is further operative for collecting consumption data from a smart meter.

10. The system of claim 7, wherein the at least one constraint comprises at least one of user availability, comfort, user preference for device usage time and duration and delay, user preference for device usage intensity and change in intensity, user preference for device co-scheduling and re-scheduling, cost related to reactive power, and available source of power.

11. The system of claim 7, wherein the at least one processor coupled to the memory operative for computing the operating schedule comprises is further operative for co-scheduling multiple appliances to improve a net power factor.

12. The system of claim 7, wherein the at least one processor coupled to the memory operative for computing the operating schedule comprises is further operative for re-scheduling an appliance based on real-time pricing of reactive power.

13. The article of manufacture of claim 1, wherein the computer readable instructions which, when implemented, further cause a computer to carry out a method step comprising:
storing the consumption profile for each of the at least one inductive appliance and the at least one capacitive appliance in a database.

14. The system of claim 7, wherein the at least one processor coupled to the memory is further operative for:
storing the consumption profile for each of the at least one inductive appliance and the at least one capacitive appliance in a database.

15. The article of manufacture of claim 1, wherein the computer readable instructions which, when implemented, further cause a computer to carry out a method step comprising:
displaying the operating schedule via an output device.

16. The system of claim 7, wherein the at least one processor coupled to the memory is further operative for:
displaying the operating schedule via an output device.

17. An article of manufacture comprising a computer readable storage medium having computer readable instructions tangibly embodied thereon which, when implemented, cause a computer to carry out a plurality of method steps comprising:
classifying, from a collection of multiple appliances, one or more inductive appliances and one or more capacitive appliances;
computing one or more reactive power parameters pertaining to the one or more inductive appliances and the one or more capacitive appliances; and
scheduling a subset of the one or more inductive appliances and the one or more capacitive appliances together to shorten flow of the reactive power within the one or more inductive appliances and the one or more capacitive appliances by minimizing a cost function, wherein said cost function is based on at least (i) a cost for consuming reactive power, (ii) a level of reactive power consumption by the one or more inductive appliances and the one or more capacitive appliances, (iii) a rate for reactive power, and (iv) the number of appliances among the one or more inductive appliances and the one or more capacitive appliances.

18. The article of manufacture of claim 17, wherein the cost function is further based on source power capacity.

19. The article of manufacture of claim 17, wherein the cost function is further based on measures of user inconvenience when an operating level and an operating time, respectively, of a given appliance are modified.

20. The article of manufacture of claim 17, wherein the cost function is further based on power consumed by a load associated with the one or more inductive appliances and the one or more capacitive appliances.

* * * * *